(12) United States Patent
Netzer

(10) Patent No.: US 6,490,920 B1
(45) Date of Patent: Dec. 10, 2002

(54) COMPENSATED CAPACITIVE LIQUID LEVEL SENSOR

(75) Inventor: Yishay Netzer, Yuvalim (IL)

(73) Assignee: Millennium Sensors Ltd., Misgav (IL)

( * ) Notice: Subject to any disclaimer, the term of this patent is extended or adjusted under 35 U.S.C. 154(b) by 0 days.

(21) Appl. No.: 09/513,182

(22) Filed: Feb. 25, 2000

Related U.S. Application Data

(63) Continuation-in-part of application No. PCT/US98/17477, filed on Aug. 24, 1998, which is a continuation-in-part of application No. 08/917,187, filed on Aug. 25, 1997, now abandoned, which is a continuation-in-part of application No. 09/118,371, filed on Jul. 17, 1998, now abandoned.

(51) Int. Cl.[7] .............................................. G01F 23/26
(52) U.S. Cl. ..................... 73/304 C; 361/284; 340/620; 324/687
(58) Field of Search ..................... 33/366.19; 73/304 C; 324/658, 676, 684, 686, 687, 688, 689; 361/284; 340/620

(56) References Cited

U.S. PATENT DOCUMENTS

| | | | | | |
|---|---|---|---|---|---|
| 3,827,300 A | * | 8/1974 | Thaler | ....................... | 73/304 C |
| 3,918,306 A | * | 11/1975 | Maltby | ....................... | 73/304 C |
| 4,208,909 A | * | 6/1980 | Maltby et al. | ............ | 73/304 C |
| 4,450,501 A | * | 5/1984 | Kabayashi | ................. | 73/304 C |
| 4,603,581 A | * | 8/1986 | Yamanoue et al. | ........ | 73/304 C |
| 4,757,252 A | * | 7/1988 | Maltby et al. | ............. | 324/61 P |
| 5,050,431 A | * | 9/1991 | McDonald | ................ | 73/304 C |
| 5,423,206 A | * | 6/1995 | Hertzel | ....................... | 73/304 C |
| 5,423,214 A | * | 6/1995 | Lee | .......................... | 73/304 C |
| 5,900,810 A | * | 5/1999 | Park et al. | ................. | 73/304 C |

* cited by examiner

Primary Examiner—Hezron Williams
Assistant Examiner—Michael Cygan
(74) Attorney, Agent, or Firm—Mark M. Friedman

(57) ABSTRACT

A fringing-field capacitive liquid level sensor comprising an electrically insulating substrate, having a first and a second pattern of conductive capacitance plates plated on the substrate. Each pattern constitutes a fringing-field capacitor having a capacitance the value of which is both dependent on the liquid level and dependent on the dielectric constant of the liquid. The ratio of the two capacitances, however, is proportional to the liquid level and independent of the dielectric constant of the liquid. The fringing-field capacitive liquid level sensor may be used for measurement of liquids of substantially any dielectric constant without requiring full-scale calibration or knowledge of, and calibration for, dielectric constant of the liquid to be measured. Compensation for tilt angle can be provided through the addition of a second level sensor.

17 Claims, 14 Drawing Sheets

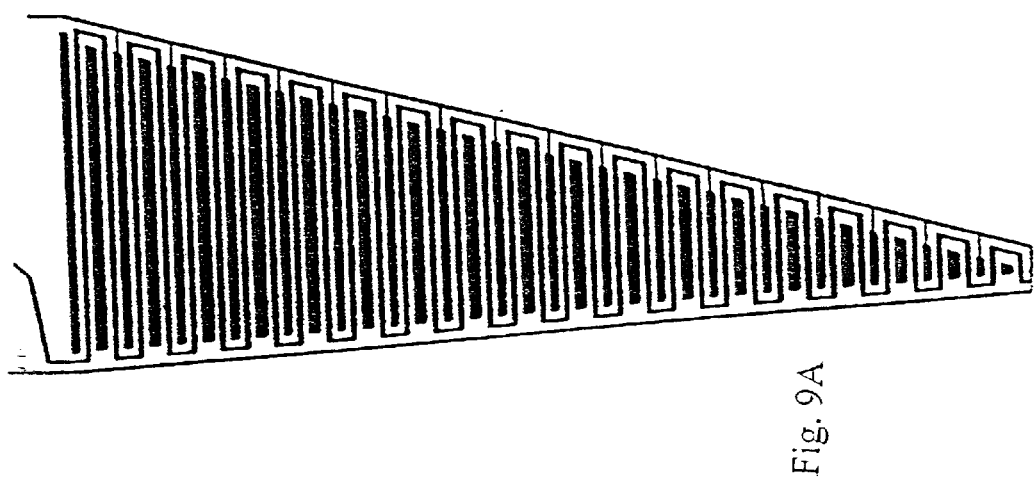
Fig. 9A
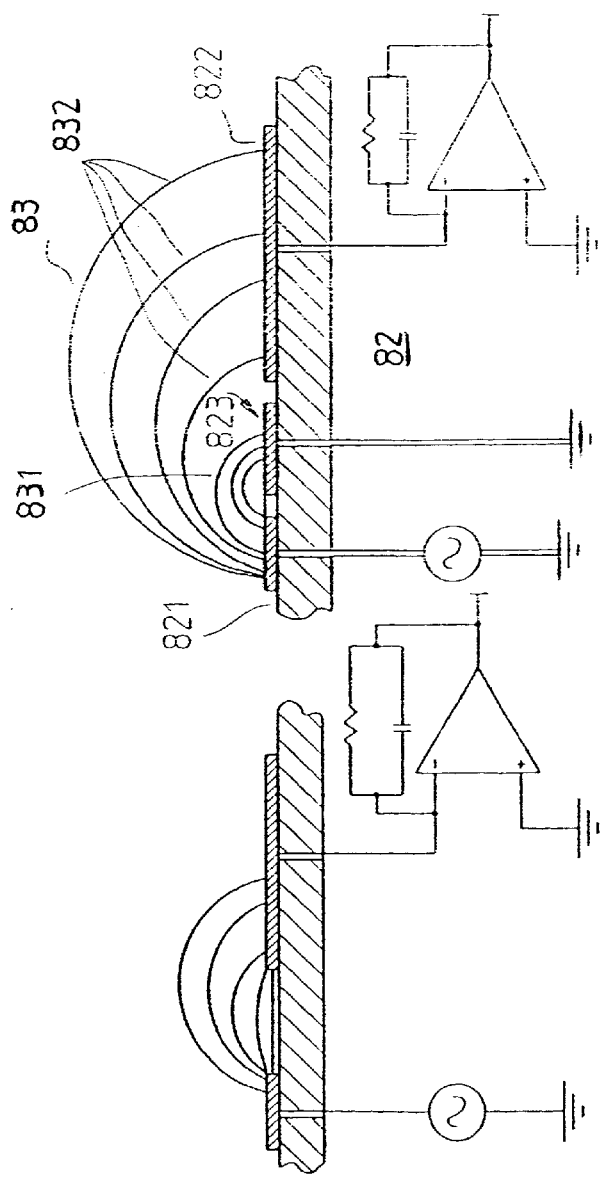
Fig. 8B
Fig. 8A

Top View

Top View

COMPENSATED CAPACITIVE LIQUID LEVEL SENSOR

CLOSELY RELATED APPLICATIONS

This application is a continuation in part of PCT/US98/17477 filed on Aug. 24, 1998 which claims priority from continuation-in-part U.S. patent application Ser. No. 08/917,187 filed on Aug. 25, 1997, now abandoned and U.S. patent application Ser. No. 09/118,371 filed on Jul. 17, 1998 now abandonded.

FIELD AND BACKGROUND OF THE INVENTION

The present invention relates to a capacitive liquid level sensor, and more particularly, to a compensated capacitive liquid level sensor, which is insensitive to the dielectric constant of the liquid, the level of which is to be sensed. The resulting dielectric-constant-insensitive capacitive liquid level sensor has the advantage that prior knowledge of the liquid, the level of which is to be sensed, is not required. I.e., a particular vessel and sensor and sensing electronics may be provided, and used for virtually any desired liquid.

Further, the liquid-level sensor of the present invention may also be employed as an inclinometer, measuring the tilt angle relative to gravity.

1. General Description

It was found by the inventor that a compensated capacitive liquid level sensor can be made, of the fringing-field type, i.e., where the capacitive plates are co-planar, and the effective "area" of the plates is essentially zero and the liquid interacts with the fringing field between the electrodes, as shown in FIG. 2. This approach can be implemented on a flat substrate, such as a rigid or flexible printed circuit board, with the resulting two advantages:

1. Simple, batch, manufacturing.
2. The processing electronics can be mounted on the same board, thus saving interconnection wiring and reducing sensitivity to external interferences.
3. The sensor can be made as a rigid printed circuit board and can be snap mounted, e.g., on the fuel pump assembly in an automotive gas tank.

Another aspect of the present invention is a unique geometry for the capacitive plates which enables a measurement range extending the whole sensor length. This geometry provides two capacitances each extending the whole sensor length, and whose ratio is directly proportional to the liquid level, independent of the dielectric constant of the liquid. The geometry is also applicable to uniform field sensors.

Another object of the invention is a capacitive level sensor for automotive application that is cost competitive with float-type level sensors.

Another object of the invention is a fringing-field capacitive level sensor that is relatively insensitive to contamination deposited between the electrodes of the fringing-field capacitive sensor, and relatively insensitive to liquid splashed over the non-immersed portion of the sensing plates. Such a sensor is typically useful for automotive applications.

In an inclinometer application, the tilt angle relative to gravity may be measured, providing an output proportional to the sine of the tilt angle.

In the following description and claims the terms plates and electrodes are interchangeably used with respect to conductive elements of the capacitors. Also the term "uniform field capacitive sensor" and "parallel plates capacitive sensors" are interchangeably used and include two facing capacitor plates not necessarily planar and not necessarily with a uniform spacing.

2. Prior Art

There are various methods for measuring the liquid level in tanks. A survey of these methods can be found in: *A Look at Level Sensing Sensors,* pp. 29–34, August 1990, Vol. 7, No. 9. One well known method is based on the effect of the liquid level on capacitance plates, wherein capacitive plates interacting with the liquid are excited with an alternating voltage to generate a signal current depending on the liquid level.

The basic capacitive level sensor gives an erroneous result if the dielectric constant of the liquid is other than the design value, or is unknown. Compensation for variations in the dielectric constant can be performed as long as two capacitors are utilized because both capacitors will have capacitances dependent on the dielectric constant.

Prior art capacitive liquid level sensors, whether compensated or not, can be divided into uniform-field type and fringing-field type. The first type employs either parallel plates as in FIG. 1B or concentric cylinders as in FIG. 1A. In these capacitors, it is the parallel (or radial) field between the plates that interacts with the liquid, wherein the fringing field at the edges is insignificant in comparison to the parallel or radial field. The advantage of these two configurations is that by controlling the separation between the plates, the capacitance per unit height can be made relatively large, providing an accordingly large signal current. In the fringing-field type of capacitive sensor the electric field that interacts with the liquid is non-uniform.

Prior art compensated capacitive level sensors generally include an additional, known, reference capacitor that is totally immersed in the liquid. This reference capacitor is intended for measuring the dielectric constant of the liquid. By dividing the measured value of the measurement capacitance by that of the reference capacitor, a normalized output is obtained that is independent of the dielectric constant of the liquid. Level sensors of this type are described, for example, in U.S. Pat. Nos. 4,590,575, 4,667,646, 4,373,389, 4,296,630, and in 4,021,707.

An example of a prior art sensor with a reference capacitor at the bottom of the measurement vessel is provided by McDonald, U.S. Pat. No. 5,050,431, which uses a reference capacitor that is totally immersed in the liquid to compensate for variations in the dielectric constant. An interleaved area below the lower end of an electrode provides for a reference area.

In the following, the term level sensor will refer to compensated capacitive level sensors. The disadvantage of prior art level sensors, which are invariably of the uniform-field type, are the following:

1. Each of the two capacitors comprises spaced-apart plates, so the construction is relatively complicated since the plates must be isolated electrically, secured mechanically, and wired to the processing electronics.
2. Since the reference capacitor must be totally immersed in the liquid, an erroneous output is obtained for liquid levels lower than the reference capacitor height.
3. The practical requirement that the reference capacitor be located at the bottom of the container makes the measurement sensitive to contaminant liquids at the bottom of the container, since the measured dielectric constant is no longer representative of the intended liquid, for example water in a gasoline tank.

Various attempts have been made to provide a capacitive liquid level sensor without the problem of the reference capacitor at the bottom of the measurement vessel.

U.S. Pat. No. 4,373,389 is intended to overcome the deficiencies of a reference capacitor at the bottom of the container. In this patent there are two capacitive plates, one of them divided into two complementary triangles, resulting in two capacitors, each responding to the liquid level starting from bottom of the container to the maximum level to be measured. By manipulating the measured values of the measured two capacitances, the liquid level can be determined regardless of its dielectric constant. However, since the calculation is not simple, an analog-to-digital conversion, a microprocessor, and, possibly, a digital-to-analog conversion are necessary.

Lee, in U.S. Pat. No. 5,423,214, uses multiple discrete capacitors at discrete levels. However, the sensor provides a stepwise response to liquid level, rather than a continuous response.

German Patent Application DE 42 10737 describes an automotive fuel level sensor that employs the fringing field lines of a co-planar pair of electrodes that are applied on the outside of the tank—which must be non-metallic in order for the lines to penetrate into the tank. However, such sensor has a limited performance because of the following reasons:

1. Since the fuel is separated from the electrodes by the thickness of the plastic wall ($\in$ approximately 4), most of the field lines of force are shunted by the wall, and the sensor may respond unpredictably to the wall thickness, rather than to the presence of the fuel ($\in$ approximately 1.8).
2. The DE invention attempts to correct this deficiency by independently sensing the dielectric constant of the wall, however, no compensation is made for the thickness variations of the wall.
3. No compensation is made for dielectric constant variations of the fuel such as that result from additions such as of alcoholic additives.
4. The electrodes being on the outside of the tank may respond to soil deposits that adhere to the electrodes, and to fuel splashed on the non-immersed portions of the electrodes.

Compensation for the tilt angle relative to gravity of the container holding the liquid can be accomplished with the addition of a third capacitor. Florentin et al., in U.S. Pat. No. 4,935,727, use three spaced apart separate fuel sensors, for measuring the quantity of liquid obtained in a tank, which is subject to the least possible variation with changes in attitude and state of movement of the tank itself. However, the three fuel sensors are spaced angularly apart by 120°. In addition, Florentin et al. require an additional circuit to perform compensation for electrical liquid properties, even when sensing capacitors are used for the level sensors.

There is thus a widely recognized need for, and it would be highly advantageous to have, a capacitive liquid level sensor which is independent of the dielectric constant of the liquid, and preferably compensating also for a tilt angle, with a measurement range that extends the full length of the sensor plates, with a simple construction, and providing a linear output with no recourse to complex electronic manipulations, and which does not depend on the use of a fully-submerged reference sensor to achieve a reading which is independent of the dielectric constant of the liquid.

SUMMARY OF THE INVENTION

It was found that a compensated capacitive liquid level sensor can be made where the capacitive plates are co-planar, i.e., the effective "area" of the plates is essentially zero and the liquid interacts with the fringing field as shown in FIG. 2.

Preferably, the sensor is based on a thin non conductive substrate coated with conductive capacitive plates so that it is sensitive to even the low dielectric constant of fuel like gasoline ($\in$ approximately 1.8), but is relatively insensitive to contamination deposited on the electrodes and to the substrate material itself.

Another aspect of the present invention is a unique geometry for the capacitive plates, which extends the whole measurement range.

Another aspect of the invention described below, is that the liquid level sensor does not require the use of a fully-immersed full-scale reference capacitor as in the prior art. In the prior art, for compensated liquid level sensors, a voltage proportional to the capacitance of a capacitor with a constant incremental capacitance is divided by a voltage proportional to the capacitance of a fully-immersed referenced capacitor, i.e., with a zero incremental capacitance. In the current invention, both capacitors preferably have non-zero incremental capacitances as will be explained below.

Another object of the invention is a capacitive level sensor for automotive application that is cost competitive with float type level sensors.

Another aspect of the current invention involves the use of two spaced apart level sensors wherein by taking the difference of their two outputs a signal proportional to the tilt angle of the liquid tank is obtained in addition to the liquid level.

Accordingly, there is provided a uniform field compensated-type capacitive sensor for measuring the liquid level of a liquid having a dielectric constant inside a container, wherein the sensor is fixed to the container and includes: first and second non-conductive substrates facing each other; at least three electrodes printed on the substrates that interact capacitively with the liquid, the at least three electrodes constituting at least two sensing capacitors with capacitances which depend on the liquid level, wherein the electrodes extend substantially from a lower level to a higher level of the container, the lower level and the higher level bounding a desired measurement range, and wherein the functions that describe the dependence of the capacitances on the liquid level differ from each other; and signal processing means for converting the capacitances into electrical signals that can be processed to provide an output signal indicative of the liquid level relative to the sensor, wherein the output signal is substantially independent of the electrical properties of the liquid.

According to certain preferred embodiments, each of the at least two sensing capacitors has an incremental capacitance, and a ratio of the incremental capacitances integrated from the lower level to the liquid level is proportional or linearly proportional to the liquid level and substantially independent of the electrical properties of the liquid.

According to still further features of preferred embodiments of the current invention, the sensor further includes: a sealed enclosure, with at least a portion of the signal processing means contained within the enclosure.

In embodiments where the container has a tilt angle relative to gravity in at least one axis, the sensor preferably further includes: at least one other sensing capacitor with an output signal, wherein the at least one other sensing capacitor is spaced apart from the at least three electrodes. Preferably, the signal processing means further includes electronics for processing the output signal from the at least one other sensing capacitor, and the output signal from the signal processing means is also substantially independent of the tilt angle of the container.

According to a second preferred embodiment of the current invention, there is provided a fringing field capacitive sensor for measuring the liquid level of a liquid having a dielectric constant inside a container, wherein the sensor is fixed to the container and comprises: a non-conductive substrate with at least a first exposed surface; at least three electrodes printed on the substrate that interact capacitively with the liquid, the at least three electrodes constituting at least two sensing capacitors with capacitances which depend on the liquid level, wherein the electrodes extend substantially from a lower level to a higher level of the container, the lower level and the higher level bounding a desired measurement range, and wherein the functions that describe the dependence of the capacitances on the liquid level differ from each other; and signal processing means for converting the capacitances into electrical signals that can be processed to provide an output signal indicative of the liquid level relative to the sensor, wherein the output signal is substantially independent of the electrical properties of the liquid.

According to certain preferred embodiments, each of the at least two sensing capacitors has an incremental capacitance, and a ratio of the incremental capacitances integrated from the lower level to the liquid level is proportional or linearly proportional to the liquid level and substantially independent of the electrical properties of the liquid.

In certain preferred embodiments, the substrate comprises a flexible plastic sheet. Preferably, the substrate is a Mylar sheet and the electrodes are printed with carbon ink. Preferably, the electrodes are interdigitated and slanted.

According to still further features in preferred embodiments of the current invention, the sensor further includes: a shield electrode printed between electrodes of at least one of the at least two sensing capacitors for decreasing the sensitivity of the output signal to contamination and liquid splashes on the substrate.

Preferably, the sensor further includes: a sealed enclosure, wherein at least a portion of the signal processing means are contained within the enclosure. The enclosure preferably also encloses capacitor plates printed on the substrate and enabling compensation for temperature induced variations to the capacitances.

According to certain preferred embodiments, the at least two sensing capacitors are printed on the first exposed surface of the substrate, and a grounded layer is printed on a second exposed surface of the substrate to protect against external electrical interference.

In embodiments where the container has a tilt angle relative to gravity in at least one axis, the sensor preferably further includes: at least one other sensing capacitor with an output signal, wherein the at least one other sensing capacitor is printed on the substrate and spaced apart from the at least three electrodes. Preferably; the signal processing means further includes electronics for processing the output signal from the at least one other sensing capacitor, and the output signal from the signal processing means is also substantially independent of the tilt angle of the container.

BRIEF DESCRIPTION OF THE DRAWINGS

The invention is herein described, by way of example only, with reference to the accompanying drawings, wherein:

FIG. 5$b$ illustrates a pair of printed circuit compensation capacitors;

FIG. 8A is a side view illustrating the electric field between two electrodes such as in FIG. 2;

FIG. 8B is a side view of the electric field between two electrodes with a shield between the electrodes for diminishing the effect of contamination between the plates;

FIG. 9A is the capacitor plate of FIG. 4A with a grounded shield;

DESCRIPTION OF THE PREFERRED EMBODIMENTS

Figure 1A:
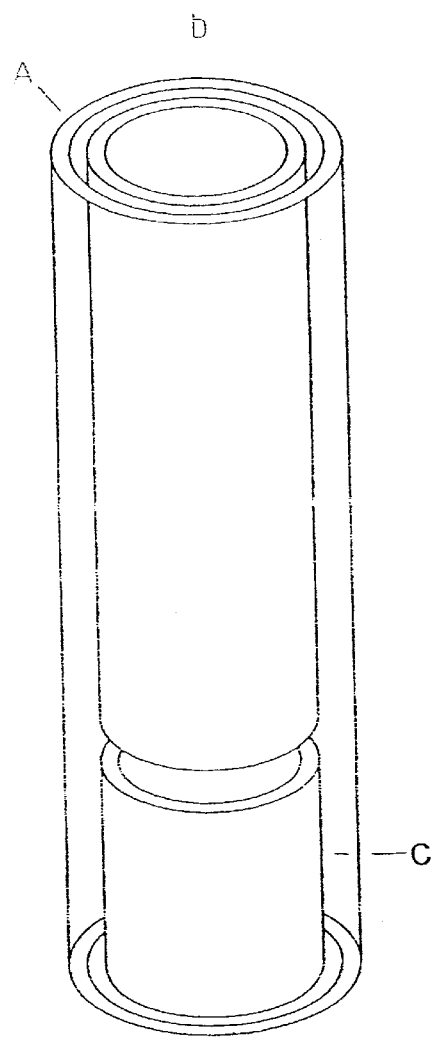
FIG. 1A is a prior art cylindrical, compensated, capacitive-type, liquid level sensor.
Figure 1B:
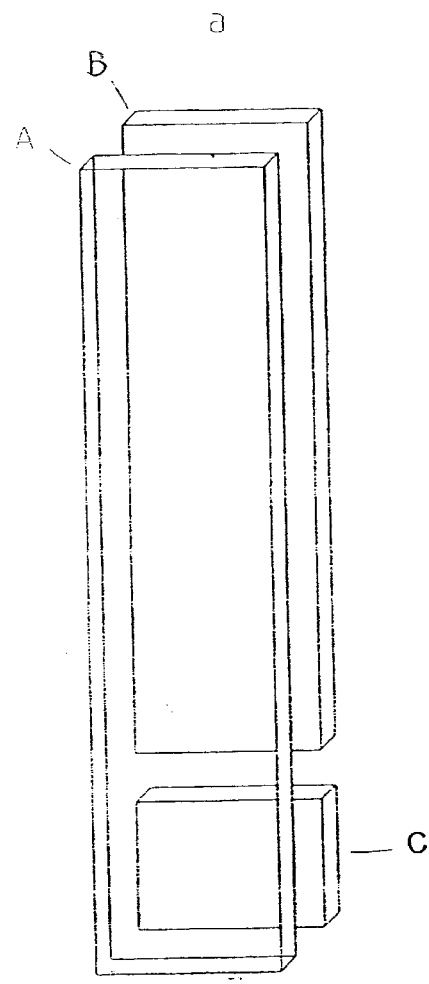
FIG. 1B is a prior art parallel plate, compensated, capacitive-type, liquid level sensor.

The present invention is of a capacitive liquid level sensor which can be used to measure the level of any liquid, without prior knowledge of the liquid to be measured and its dielectric constant.

Specifically, the present invention can be used to measure the liquid level of gasoline in an automobile, even if there is sludge or water at the bottom of the tank, or contamination between the plates, which would provide errors in the prior art implementations.

I. Theory of Operation

The invention is based on employing a primary capacitor $C_1$, and a secondary capacitor $C_2$, formed from at least three electrodes each of which extends from a lower to a higher level of the container holding the liquid whose level is to be measured. The higher and lower levels of the container bound the bottom and the top of the desired measurement range.

The capacitance $dC_1$ per unit height dh, incremental capacitance, of the primary capacitor, excluding its "dry" component is given by $$dC_1 = f(h)dh.$$

When immersed to a depth h in a liquid with a dielectric constant $\in$ the integrated capacitance over the entire depth h would be:

$$C1 = k_1 \int f(h) \in dh$$

where $k_1$ is a constant which depends on the geometry, and $\in$ is the dielectric constant of the liquid. $\int$ is used herein as the integration symbol.

The capacitance per unit height of the secondary capacitor, again excluding its dry component, is given by $dC_2 = g(h)dh$ and the integrated capacitance over the entire depth h would be:

$$C_2 = k_2 \int g(h) \in dh$$

where $k_2$ is another geometry dependent constant. Our aim is to find two functions f(h) and g(h) such that the ratio of the two integrals is:

$$C_1/C_2 = r(h)$$

i.e., independent of $\in$ and dependent on h in accordance with a prescribed function r(h), e.g., such as may be needed to provide an output signal proportional to the volume of a fuel contained in an automotive fuel tank which has a non uniform cross-section. In the special case when the output signal should be linearly proportional to the liquid level, our aim is a pair of functions, $f(h) = k_1 h$, i.e., the capacitance per unit length is linearly increasing with h, and $g(h) = k_2$, where the capacitance per unit length is uniform. Performing the integrations for this pair of functions, f(h) and g(h), results respectively in:

$$C_1 = \tfrac{1}{2} k_1 \in h^2$$

and $$C_2 = k_2 \in h.$$

Dividing, $$C_1/C_2 = (\tfrac{1}{2} k_1 \in h^2)/(k_2 \in h) = \tfrac{1}{2}(k_1/k_2)h.$$

Thus the ratio is linearly proportional to the immersion depth h and is independent of $\in$. This pair of functions is a member of an infinite set of pairs of functions that maintain the above ratio, such as the pair of functions $f(h)=(k_3 h^2)$ and $g(h)=(k_4 h)$, etc., however, the function pair of the example integrated and divided above is preferable in being easier to realize, as shown below. The division operation needed for obtaining the liquid level can usually be implemented digitally or by using an analog divider.

In addition to h the magnitude of $\in$ can also be calculated using the following expression:

$$C_2^2/C_1 = 2k_2^2/k_1 \in$$

The value of $\in$ may be useful as described further below.

The principles and operation of a dielectric-constant-insensitive capacitive liquid level sensor according to the present invention may be better understood with reference to the drawings and the accompanying description.

II. Preferred Embodiments

Figure 3D:
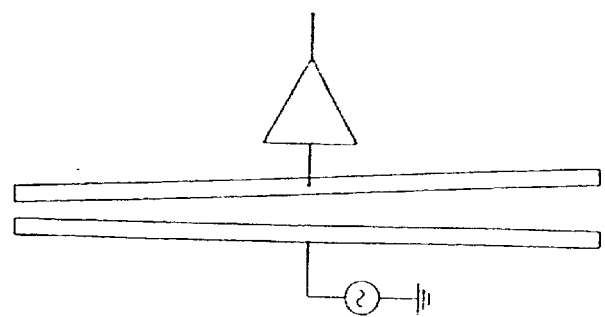
FIG. 3D is a side view of a non-parallel planar plates capacitor with capacitance per unit length that is increasing with height, due to a variable separation between the plates.
Figure 3C:
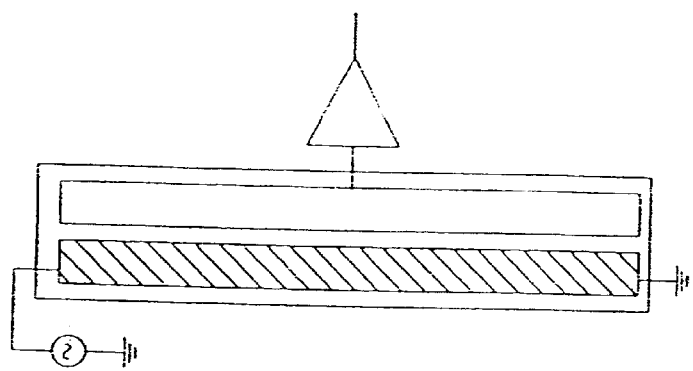
FIG. 3C is a front view of a second co-planar plates capacitor with capacitance per unit length that is increasing with height due to a non-uniform excitation potential.
Figure 3B:
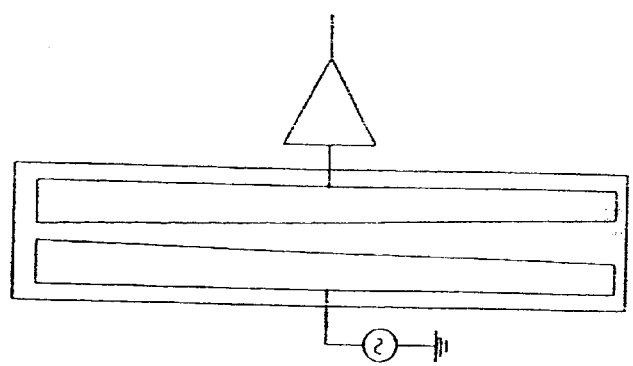
FIG. 3B is a front view of a first co-planar plates capacitor with capacitance per unit length that is increasing with height due to a non-uniform gap.

Referring now to the drawings, a first implementation of the coplanar primary capacitor with the dependence f(h) is shown in FIG. 3B, where the plates are separated by a gap that is substantially inversely proportional to the height h, as a result the capacitance per unit height is linearly proportional to the height.

A second implementation of the primary capacitor is shown in FIG. 3C. In this implementation the separation between the two plates is constant, however, one plate is printed using a conductive ink with a relatively high resistivity such as carbon ink. The bottom of this plate is grounded and the excitation is applied to its top, the plate thus serves as a distributed voltage divider, and the excitation voltage applied to each elemental capacitance is proportional to its height, the capacitive current thus behaves similarly to the previous case.

A third implementation of the primary capacitor is shown in FIG. 3D. This configuration is similar to the one in FIG. 3B in that the separation between the two plates is decreasing with height, however, the two electrodes are not co-planar.

Figure 3A:
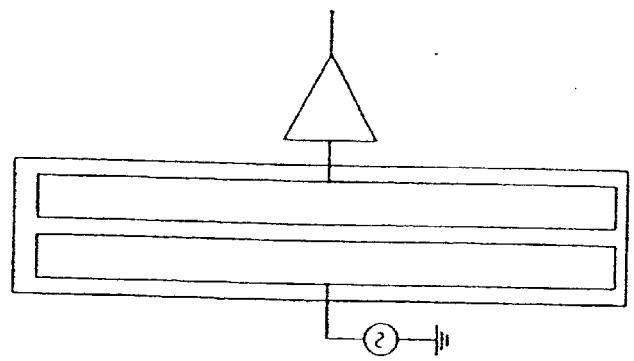
FIG. 3A is a front view of a basic capacitive liquid level sensor with co-planar plates, and with a constant capacitance per unit length.

The secondary capacitor should have a constant capacitance per unit height, this could be achieved, for a co-planar sensor, for example, by a set of two or more vertical bands as shown in FIG. 3A.

Figure 4A:
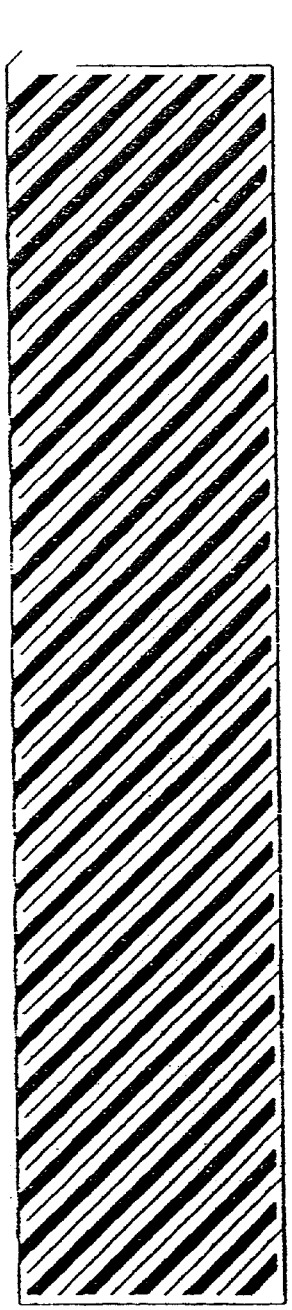
FIG. 4A is a planar capacitor with interdigitated and slanted plates which has a capacitance per unit length that is increasing with height.

A preferred implementation of a primary capacitor is shown in FIG. 4A. The capacitor comprises multiple elements based on discrete printed bands that constitute two interdigitated plates. This is in order to obtain higher capacitance per unit area, resulting in a larger signal level.

The inverted triangle shape of the capacitor in FIG. 4A approximates a capacitance per unit height that is increasing with height. I.e., the incremental sensitivity of this sensor electrode pair to liquid height increases with the height of the measured liquid. This provides a non-linear function of sensor sensitivity versus liquid height. In order for the sensitivity increase to be a continuous function, rather than stair-case function, the printed bands are slanted, such that each band is gradually immersed as the liquid level rises.

Figure 4B:
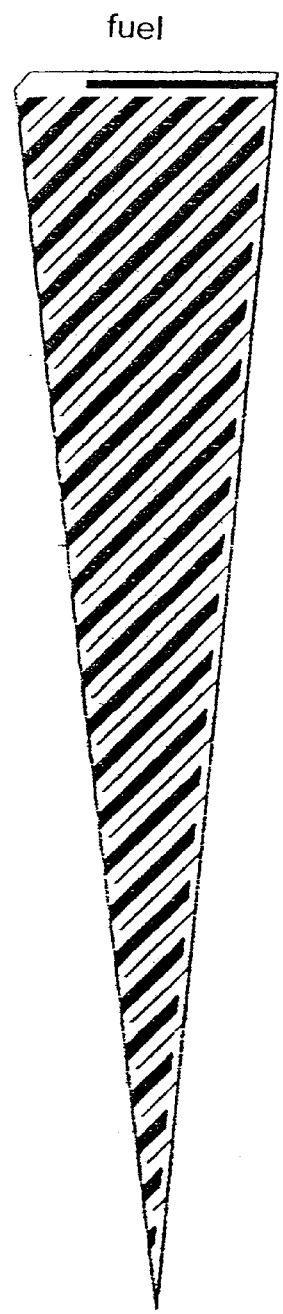
FIG. 4B is a planar capacitor with interdigitated and slanted plates which has a constant capacitance per unit length.

A preferred embodiment of the secondary co-planar (fringing field) capacitor is shown in FIG. 4B. This geometry is similar to that in FIG. 4A, except that the shape is rectangular in order to obtain constant capacitance per unit height. i.e., the incremental sensitivity of this capacitor is constant with the height of the measured liquid. This provides a linearly increasing capacitance as a function of the liquid level.

The two electrode pairs of FIGS. 4A and 4B are normally mounted in proximity to each other either on one side of a printed substrate, or on the opposing sides of a printed substrate, to provide a stand-alone sensor. The electrodes may also be deposited on the inside or on the outside of a dielectric wall of a liquid container.

The capacitance of each of the sensing capacitors is equivalent to two capacitors in parallel: 1) A "dry" portion which is due to the substrate material and the air; and 2) A "wet" portion which is due to the immersion in the liquid. The expression developed above for the liquid level h as a function of the measured capacitances is only correct if the dry capacitances are compensated i.e. their values are subtracted from the actually measured values. However, the portion of the "dry" capacitance which is due to the substrate may be temperature dependent, especially when the substrate is relatively thick. As a result, a fixed compensation will be effective only over a narrow temperature range.

Figure 5A:
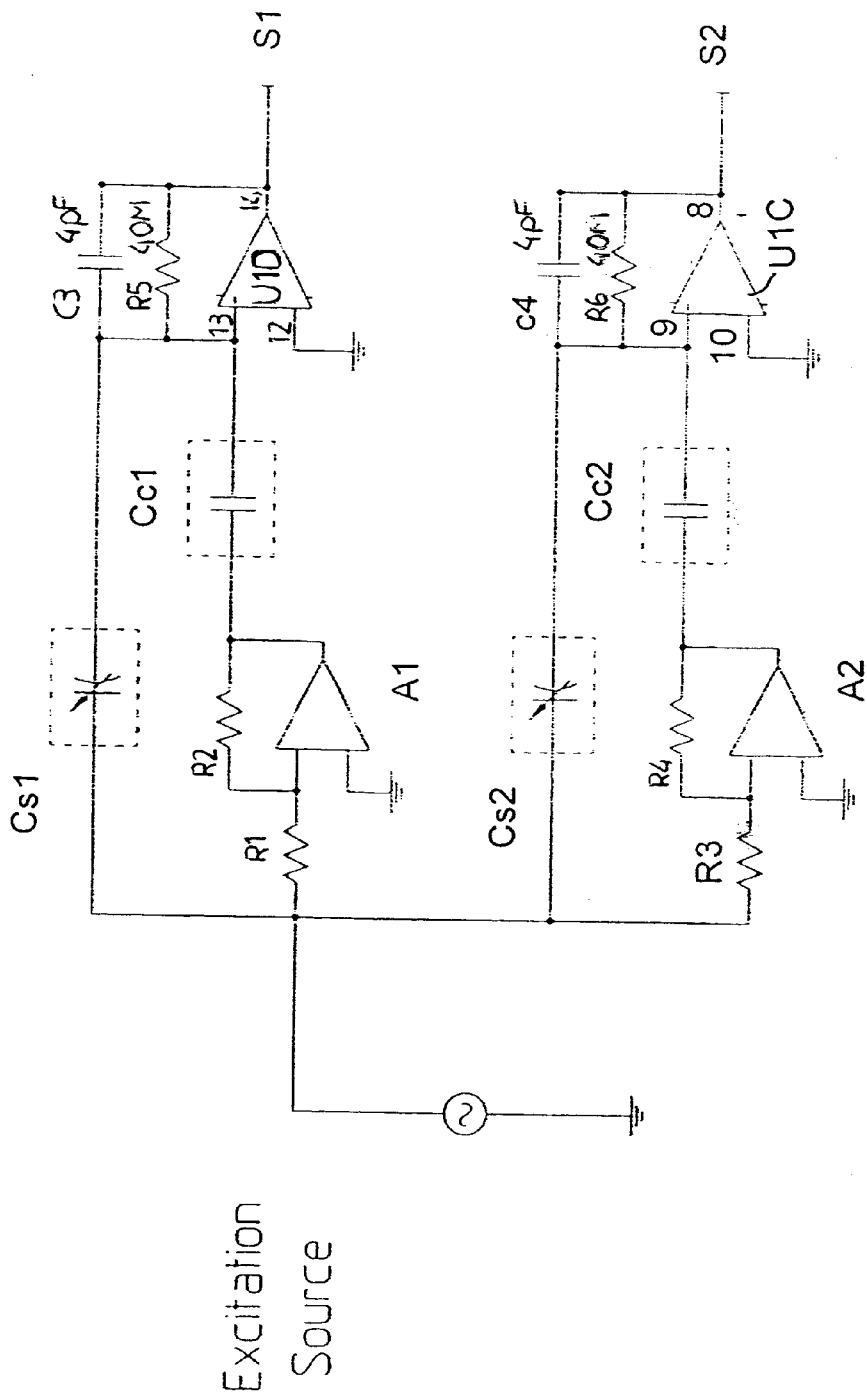
FIG. 5$a$ is a circuit diagram illustrating how a compensation signal is generated.
Figure 5B:
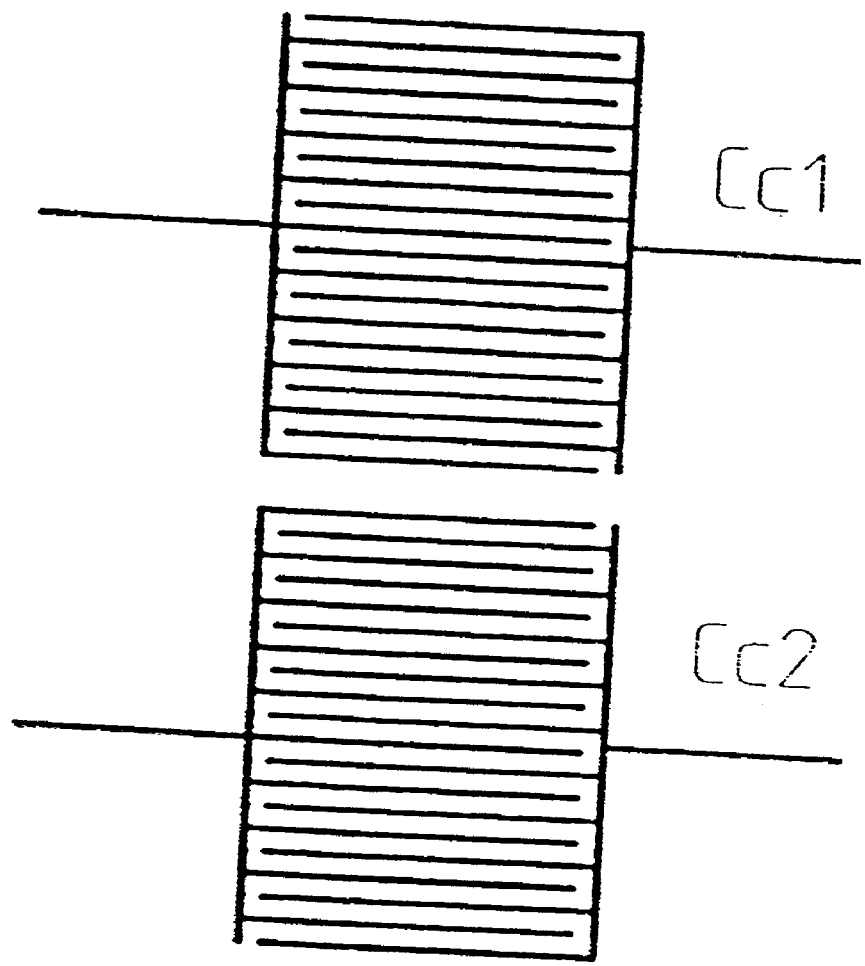

To effectively compensate over a wide temperature range the compensation capacitance should behave exactly as the actual dry capacitance. This can be easily achieved if the compensation capacitance is printed on the same substrate. In FIG. 5-a two signal voltages S1 and S2 are generated by applying an AC excitation source to the primary and secondary sensing capacitances $Cs_1$ and $Cs_2$ that feed charge amplifiers U1d and U1c. Phase inverted versions of the excitation sources are applied to compensation capacitors $Cc_1$ and $Cc_2$ through inverting voltage amplifiers $A_1$ and $A_2$ with respective gains $R_2/R_1$ and $R_4/R_3$. If the "dry" components of the two sensing capacitors are respectively $Csd_1$ and $Csd_2$, then in order that the two outputs S1 and S2 will be temperature compensated the following relations should hold:

$$Csd_1 = Cc_1 R_1/R_2$$

and $$Csd_2 = Cc_2 R_3/R_4$$

FIG. 5-b illustrates a pair of printed compensation capacitors Cc1 and Cc2. In a typical situation, the dimensions of each are about one square centimeter providing a capacitance of about 4 picofarads. The compensation capacitors should be kept dry, i.e., they should be protected from contact with liquid.

Figure 6:
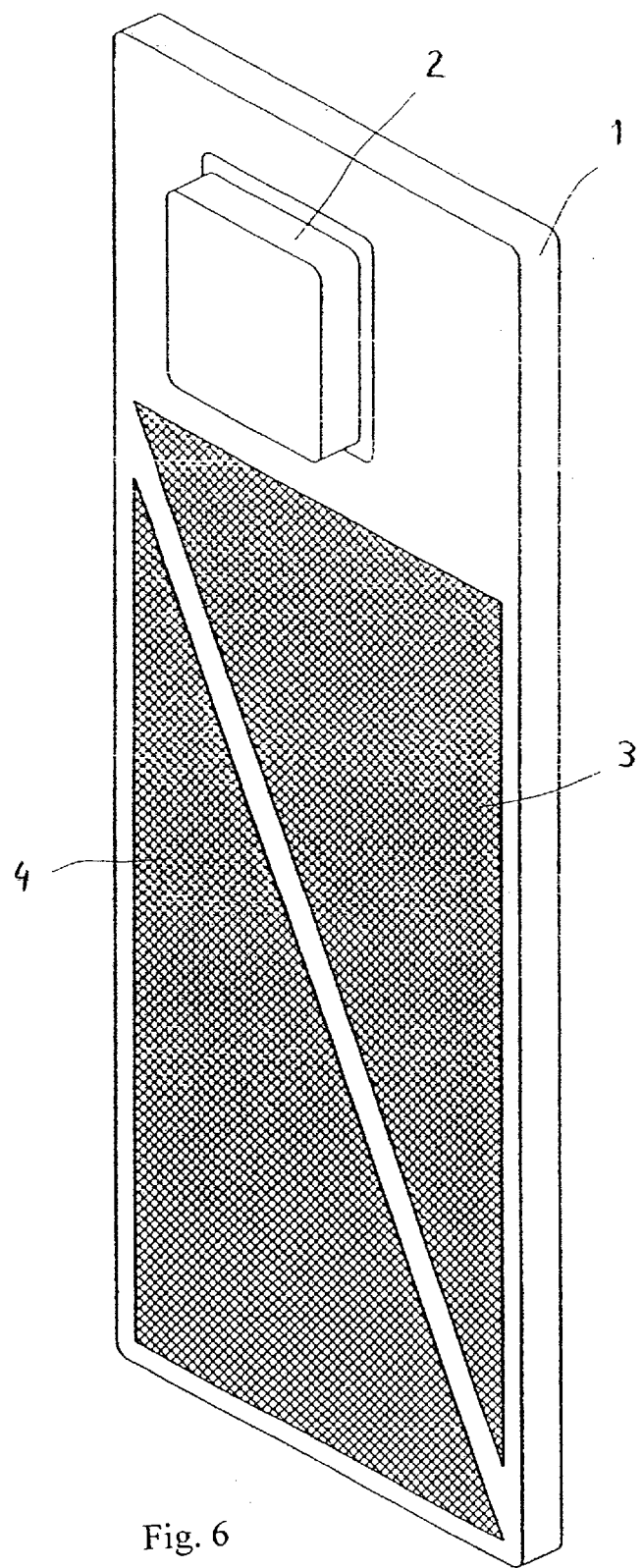
FIG. 6 illustrates an enclosure for protecting a portion of the sensor substrate from contact with the liquid.

In the preferred embodiment as in FIG. 6, a metallic cover 2 is soldered to the substrate 1 alongside with sensing capacitive plates 3 and 4 to provide this protection by enclosing the compensation capacitors. The same cover 2 is preferably used also for protecting the sensitive portion of the signal processing electronics, such as the portion shown in FIG. 5-a from contact with the liquid. This protection of the electronic components is critical in automotive fuel level sensing applications because fuel additives, such as Methyl Alcohol, are corrosive and may attack the electronic components.

The substrate board could be based on printed circuit technology but it does not have to be either flat or rigid. In a preferred embodiment it is based on a flexible plastic sheet such as Mylar printed with conductive carbon electrodes. In this case the compensation capacitors may be fixed since with a thin substrate the temperature effect are small.

The sensing capacitor geometry using one triangular and one rectangular plates as described in reference to a fringing-field sensing capacitances in FIGS. 4a and 4b can equally be applied to uniform-field (parallel plates) liquid level sensors. The advantages of the parallel plate version is that it is possible to work with higher viscosity liquids, such as oil, because a thick liquid, once splashed and stuck to the non immersed portions of a fringing field sensor, may impair its accuracy.

A uniform field liquid level sensor according to the present invention is shown in FIG. 9-b. This sensor comprises three planar substrates, 100, 200, and 300, which are preferably printed circuit boards. In a typical embodiment of the invention, an electrode plate 201 on a first side of the central substrate, 200, serves as the signal plate, interacting capacitively with an excitation plate, 101, deposited on the substrate, 100; while a second electrode plate 202 on the second side of central substrate 200 interacts with electrode 301 on the facing side of substrate 300.

Figure 9E:
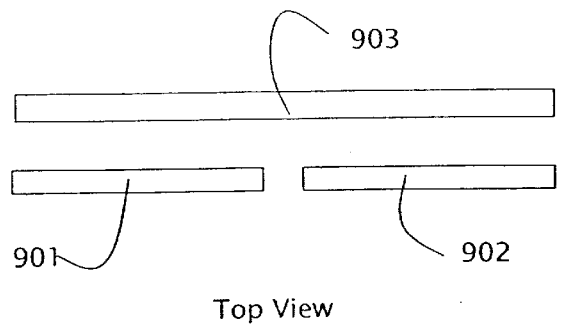
FIG. 9E illustrates a parallel plates compensated level sensor on two substrates according to the present invention.
Figure 9B:
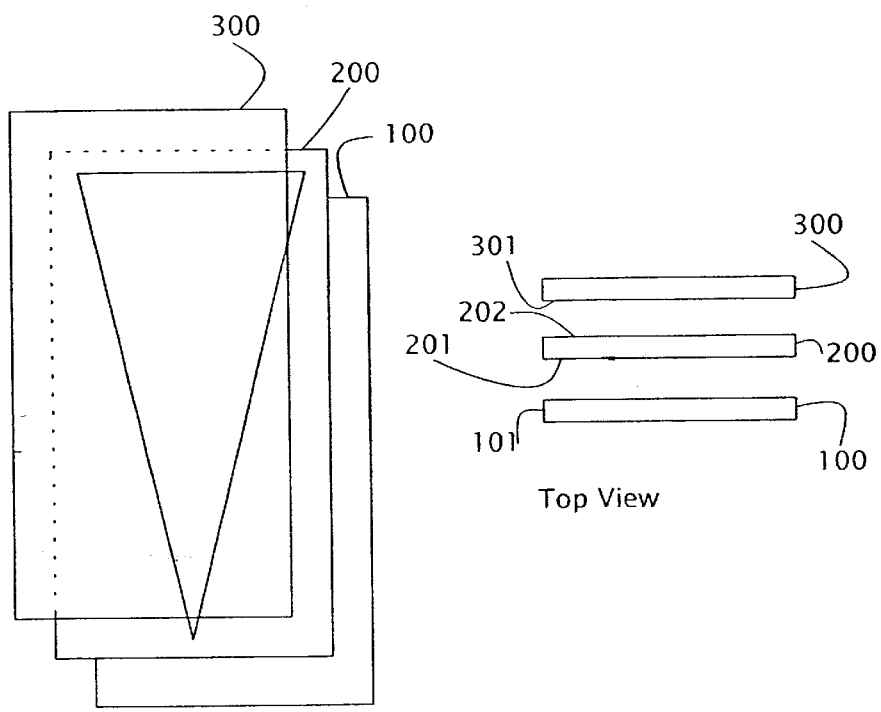
FIG. 9B is a parallel-plates level sensor according to the present invention.
Figure 9D:
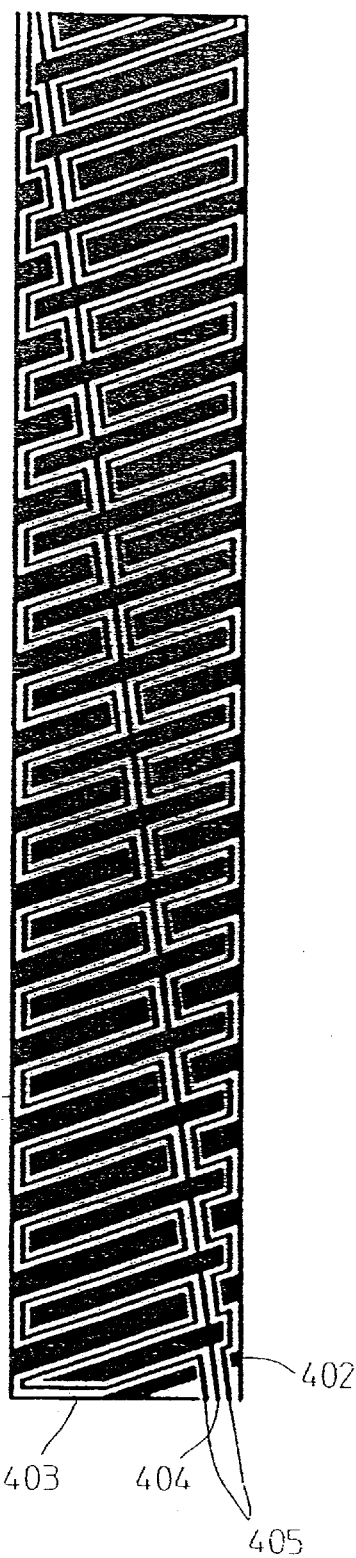
FIG. 9D illustrates a fringing field sensor according to the geometry of FIG. 9C.
Figure 9C:
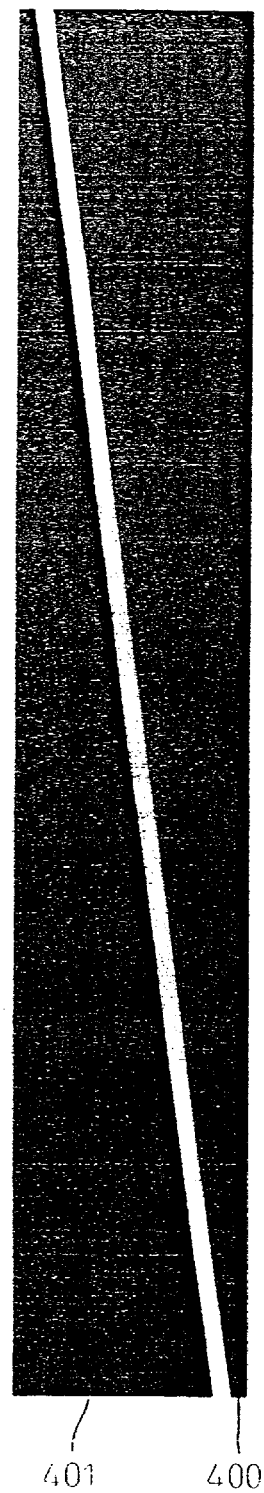
FIG. 9C illustrates a simplified version of a primary and secondary capacitance.

It is evident that electrode plates 101 and 301 could be side by side on a common substrate and facing a common electrode plate on a second substrate whereby the sensor would comprise only two substrates which are wider. This usage of only two substrates is illustrated in FIG. 9E where two electrode plates 901 and 902 on one substrate face electrode plate 903 on a second substrate.

The functions of primary and secondary capacitors fulfilled by the separate triangular and rectangular plates in FIGS. 4-a 4-b and in FIG. 9-b can be more compactly obtained as in FIG. 9-d and FIG. 9-c. More specifically, for the uniform field sensor, the function of the triangular plate 300 (in FIG. 9-b) is served by plate 400. (in FIG. 9-c) while the function of the rectangular plate 100 (in FIG. 9b) is served by the sum of the two plates 400 and 401 (in FIG. 9c). The function of plate 200 (in FIG. 9-b) is served by an additional plate (—not shown in FIG. 9c) which is opposing the substrate on which plates 400 an 401 are plated to constitute two uniform field capacitances Ca and Cb respectively, wherein the liquid level is linearly proportional to Ca/(Ca+Cb).

This construction differs from U.S. Pat. No. 4,373,389 described previously in the following major features:

1. The output level extends to the top of the sensor to its bottom, as opposed to just half of that in U.S. Pat. No. 4,373,389.
2. The output is linearly proportional to the liquid level, as opposed to parabolic dependence in U.S. Pat. No. 4,373,389.
3. Simple division, as opposed to complex mathematical relationships in U.S. Pat. No. 4,373,389.

Figure 7:
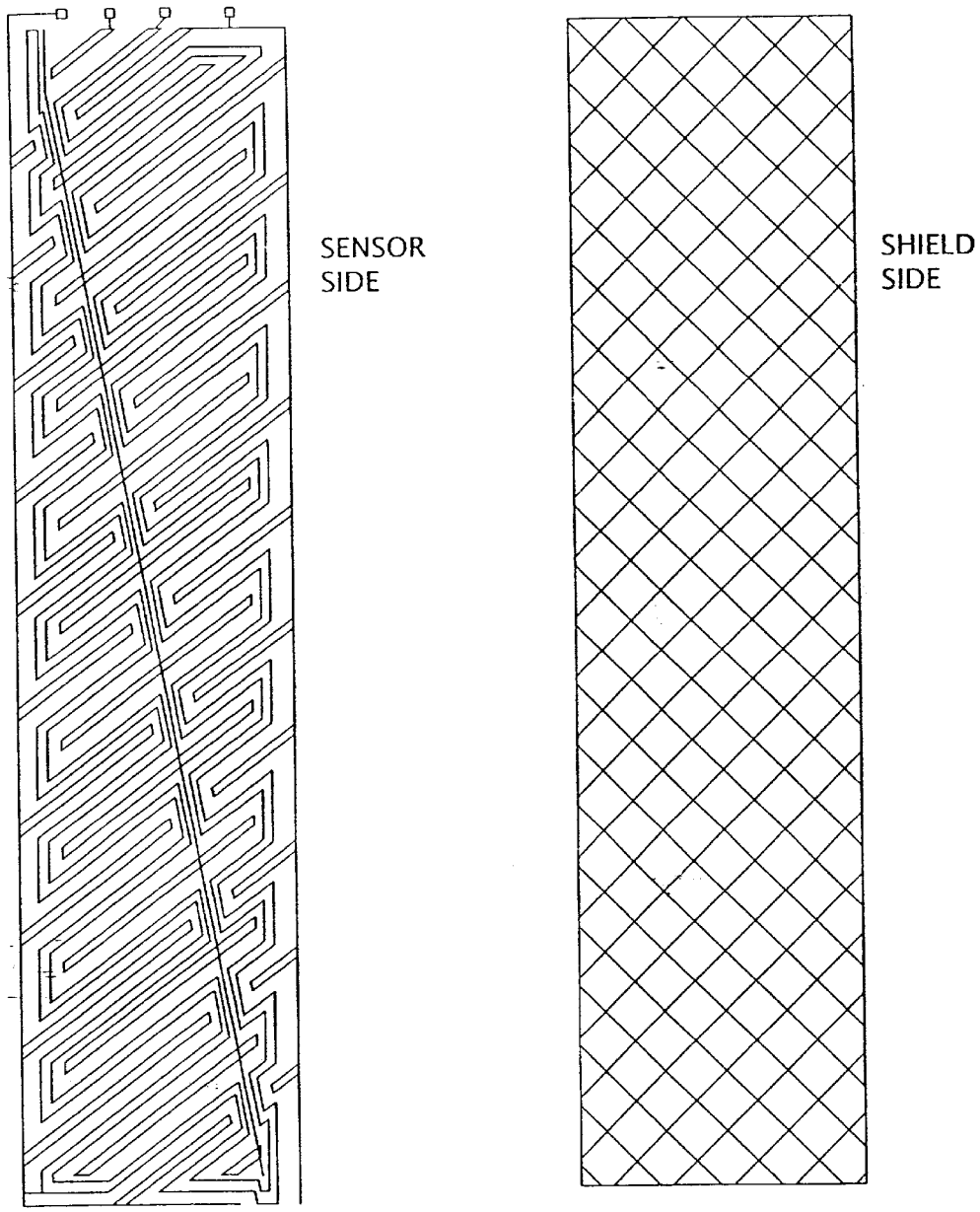
FIG. 7 illustrates a grounded layer on the second side of a substrate, providing protection against electrical interference.

Similarly to the above uniform field sensor a more compact fringing-field liquid level sensor can be implemented, wherein the triangular plate in FIG. 4-a and its rectangular complement in FIG. 4-b are replaced with a single pattern shown in FIG. 9-d, in which the capacitance between plates 402 and 404 is the equivalent of the capacitance in FIG. 4-a and the sum of the capacitance between plate 404 and plates 402 and 403 is equivalent to the capacitance in FIG. 4-b. Plate 404 serves as the common excitation plate. In this embodiment, three electrodes, on a single substrate, form two capacitors that serve for the level calculation. Ground line 405 serves to minimize the effects of contamination and splashes as described below. As only one side of the substrate is employed for the sensing capacitors the back side of the substrate can be coated with a grounded layer, as shown in FIG. 7, that serves for protection against electrical interferences.

The division of the electrodes into multiple-bands serves to increase the capacitance per unit area for obtaining a larger signal level. However, the closer the bands, the closer the lines-of-force to the substrate, and the smaller the sensitivity volume of the sensor, i.e., the volume of the liquid that is affecting the capacitance. In the limit the sensitivity volume is limited to the surface of the substrate. In practical situations, such as in fuel tanks, the liquid may contain contaminants that generate solid deposit coating the surface of the substrate. This solid deposit coating on the surface of the substrate would affect the reading, the liquid level height measurement indication, in proportion to the volume of the solid deposit coating relative to the sensitivity volume of the sensor. The same applies to liquid splashed on the plates.

The reason for this sensitivity is that the electric field is strongest in the gap region co-planar with the electrodes where contamination deposits.

Figure 2:
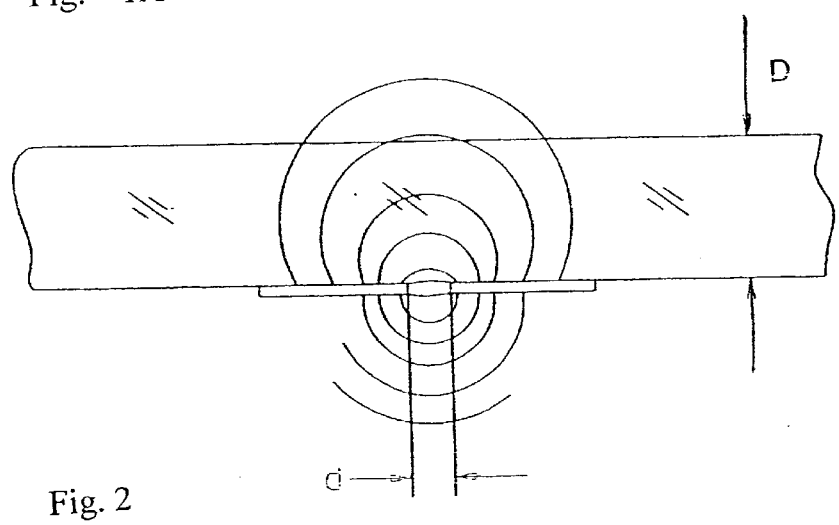
FIG. 2 is a cross-sectional view of the electric field in a liquid level sensor with co-planar plates.

FIG. 8A is a side view illustrating the electric field between two electrodes such as in FIG. 2, which would be sensitive to surface contamination between the electrodes and splashed liquid.

In order to reduce the effect of such deposits of contamination between the electrodes and splashed liquid, a shield electrode 823 is added between the electrodes, as in FIG. 8B, which shows a side view of the modified sensor, 82, and the electric field, 83, including lines of force, 831 and 832, in the region between two electrodes, 821 and 822, with grounded shield, 823 between the two electrodes. The result of shield, 823, is that most of the lines of force, 831, co-planar with the electrodes, 821 and 822, that could interact with the deposit and splashed liquid are shunted to ground, and the only lines of force, 832, coupling the electrodes, 821 and 822, are essentially the lines of force, 832, that pass through the liquid volume.

FIG. 9-a illustrates a modified fringing field capacitor that incorporates a serpentine grounded line which serves the function of plate 823 in FIG. 8b.

It should be mentioned that all of the fringing field capacitive liquid level sensors described can be used where the substrate is the container wall itself in situations where the walls are non conductive, such as glass or plastic.

An inclinometer can be used to compensate for errors induced in automotive fuel level sensors as a result of an inclination of the car and which result in either increasing or decreasing reading depending on the location of the level sensor relative to the center of the fuel tank. For a box shared tank and a mild inclination angle, the error would be proportional to L Sin θ where θ is the angle and L is the separation between the sensor and the center of the tank. In more complex fuel tanks, such as plastic blown tanks where the cross section of the tank is not constant, the error in the measured amount of fuel will also depend not only on the inclination angle, but also on the actual amount of fuel. Therefore, by measuring the tilt angle and knowing the geometry of the tank, the error can be calculated and compensated. Heretofore, this could not be made economically because of the excessive cost of conventional inclinometers. In automotive applications, the inclination that is the most importance is the pitch (fore/aft) axis. Therefore, a single-axis inclinometer would, in practice, be sufficient.

Figure 10:
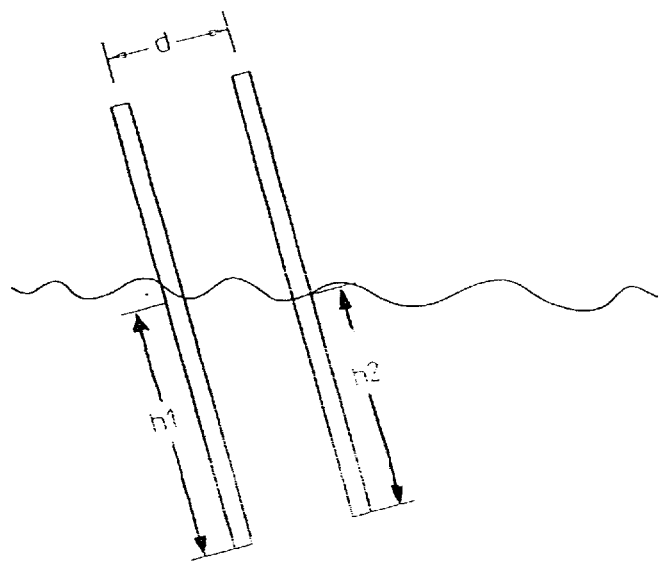
FIG. 10 illustrates two side-by-side liquid level sensors separated by a distance d.

However, a separate inclinometer is not necessary for tilt compensation because, as mentioned hereinabove, merely taking the difference between the readings of two spaced apart identical level sensors provides a signal proportional to Sin θ regardless of the actual average level of the liquid. The output will, however, be dependent on the dielectric constant of the liquid unless the level sensors are compensated. Therefore, the vehicle inclination can be obtained without any separate inclinometer by employing two level sensors in combination with the fuel itself. FIG. 10 illustrates two side-by-side liquid level sensors separated by a distance d, their outputs $V_1$ and $V_2$ will differ in proportion to d Sin θ as a result of inclination angle θ.

Figure 11:
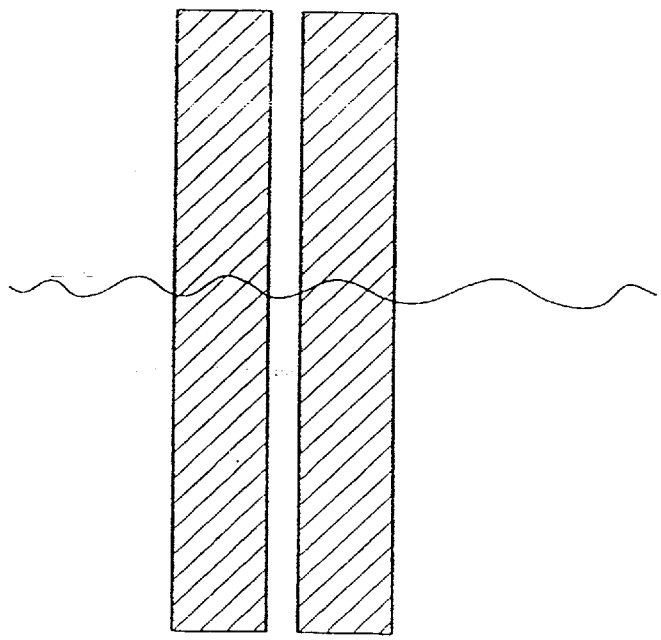
FIG. 11 illustrates two spaced apart compensated level sensors.

FIG. 11 illustrates a conceptual embodiment in which two spaced apart level sensors, which are dielectric constant compensated, as in FIG. 9-d, are printed on the same substrate, the difference $V_1-V_2$ is proportional to Sin θ and the sum $V_1+V_2$ is proportional to the uncompensated liquid level. Knowing L and d enables compensation of the inclination error in the plane of the sensor, and the measured angle as well as the inclination angle are compensated against variation of the dielectric constant ∈ of the liquid.

Figure 12:
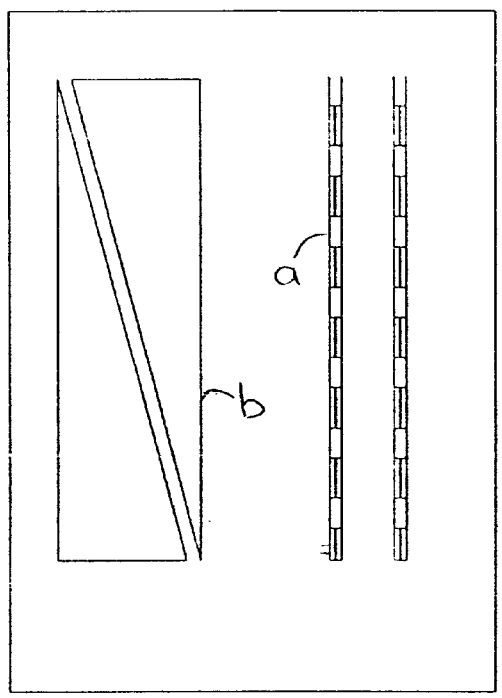
FIG. 12 illustrates a pair of liquid level sensors where only one of the pair is compensated against dielectric constant variation.

FIG. 12 illustrates a pair of spaced apart liquid level sensors a and b wherein in order to preserve substrate area only sensor b is compensated against dielectric constant variation and includes two capacitors, while sensor a comprises only one capacitor. Because the value of ∈ can be calculated, as described above in the section on the theory of operation the measured liquid level in sensor a can be corrected, thereby enabling a compensated output from both sensors a and b, hence a compensated tilt can be obtained with a minimal area.

Figure 13:
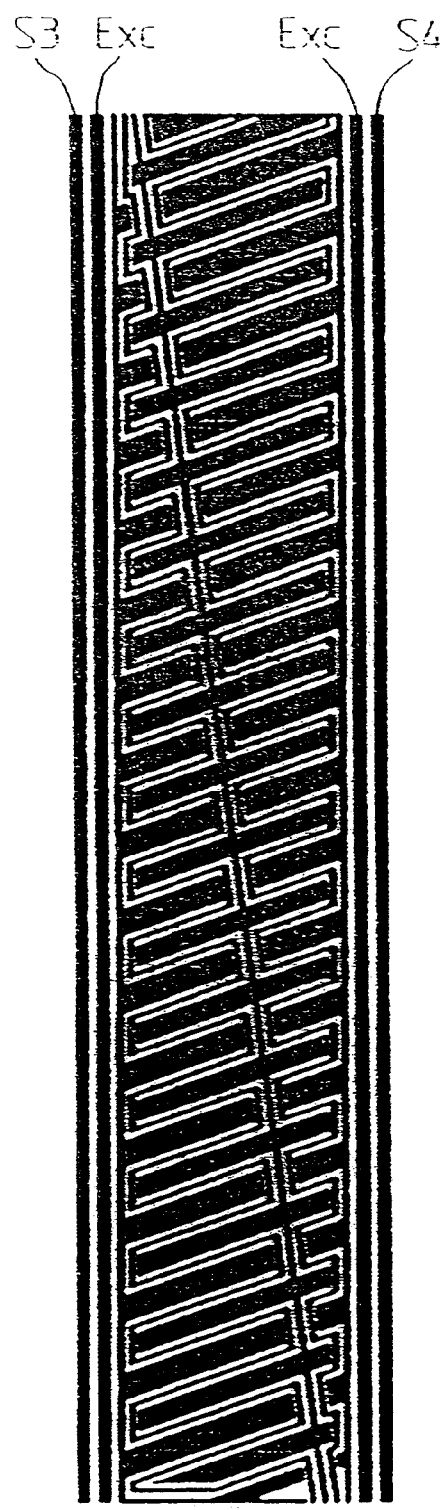
FIG. 13 shows a tilt compensated liquid level sensor.

Another embodiment of a tilt compensated liquid level sensor is shown in FIG. 13. This embodiment includes a main dielectric constant compensated level sensor and two auxiliary non compensated level sensors separated by a distance d. Each of the auxiliary level sensors include a signal plate (S3 and S4), and an excitation plate. They are not compensated against variations in the dielectric constant of the liquid and their output signals are:

$$\in k h_1 \text{ and } \in k h_2$$

where k is a constant $h_1$ and $h_2$ are the respective liquid levels and ∈ is the dielectric constant of the liquid. The Sine of the tilt angle is the difference k $(h_1-h_2)$ between the two outputs divided by d:

$$\text{Sin } \theta = \in k(h_1-h_2)/d$$

This expression includes the unknown ∈, which can be eliminated as follows:

The average liquid level obtained from the auxiliary level sensors is $h_a=\in k(h_1+h_2)/2$, but since the output $h_m$ of the main level sensor (which is independent of ∈) is essentially the same as $(h_1+h_2)/2$, therefore dividing the two provides:

$$h_a/h_m = \in k$$

and $$\text{Sin } \theta = h_a/h_m(h_1-h_2)/d$$

Figure 14:
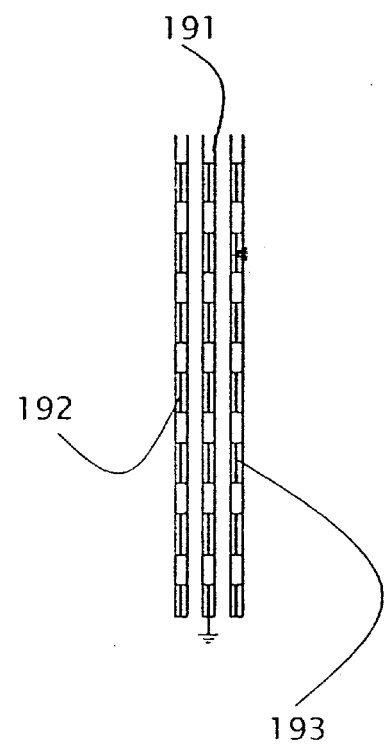
FIG. 14 illustrates a ground plate for protecting against contamination to a non-dielectric compensated sensor such as in FIG. 12.

In both FIG. 12 and FIG. 13, the level sensors which are non dielectric constant compensated are not protected against deposited contamination with a contamination shield plate. Although this protection is not critical in automotive applications, because a relatively large error can be tolerated, protection can be achieved as in FIG. 14 by adding a ground plate 191 between the plates 192 and 193.

Figure 15:
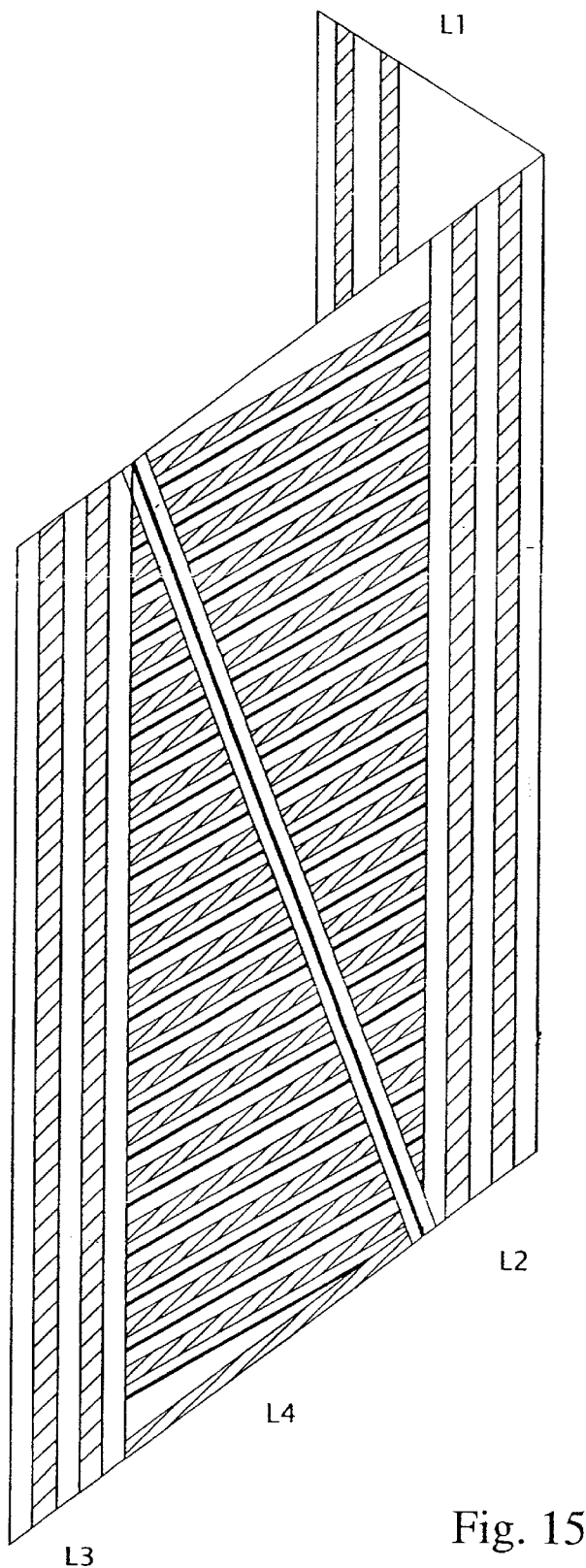
FIG. 15 illustrates a sensor providing two axis tilt and dielectric constant compensation.

In applications where compensation for the tilt angle of the tank in the cross axis is also desired the sensor substrate can be bent 90 degrees as in FIG. 15 and include three printed non compensated level sensor L1, L2 and L3. It would be obvious to those skilled in the art that the difference between the outputs of L2 and L1 and the outputs of L2 and L3 may in conjunction with a single compensated liquid level sensor L4 and in a similar manner to the single axis compensated embodiment described above, provide a two-axis tilt and dielectric constant compensated liquid level sensor. The preferred embodiment of this version is based on a flexible Mylar substrate.

Other embodiments of the present invention include liquid level sensors with immersion dependent capacitances which are based on capacitors illustrated in FIGS. 3b, 3c, and 3d.

While the invention has been described with respect to a limited number of embodiments, it will be appreciated that many variations, modifications and other applications of the invention may be made.

What is claimed is:

1. A uniform field compensated-type capacitive sensor for measuring the liquid level of a liquid having a dielectric constant inside a container, wherein said sensor is fixed to said container and comprises:

first and second non-conductive substrates facing each other;

at least three electrodes formed on said substrates and extending substantially from a lower level to a higher level, said lower level and said higher level bounding a desired measurement range, said at least three electrodes being configured to interact capacitively with said liquid constituting at least two sensing capacitors each with a capacitance which varies as a function of the liquid level within said desired measurement range, and wherein said functions that describe the dependence of said capacitances on said liquid level differ from each other; and signal processing means for converting said capacitances into electrical signals and processing said electrical signals to provide an output signal indicative of said liquid level relative to said sensor, wherein said output signal is substantially independent of the electrical properties of said liquid.

2. A sensor as recited in claim 1, wherein a ratio of said capacitances integrated from said lower level to said liquid level is proportional to said liquid level and substantially independent of the electrical properties of said liquid.

3. A sensor as recited in claim 2, wherein said ratio of said incremental capacitances integrated from said lower level to said liquid level is substantially linearly proportional to said liquid level and substantially independent of the electrical properties of said liquid.

4. A sensor as recited in claim 1, further comprising a sealed enclosure, wherein at least a portion of said signal processing means are contained within said enclosure.

5. A sensor as recited in claim 1, wherein said container has a tilt angle relative to gravity in at least one axis, the sensor further comprising:

at least two additional electrodes spaced apart from said at least three electrodes so as to form at least one other sensing capacitor with an output signal; and wherein said signal processing means is electrically associated with said at least one other sensing capacitor and further includes electronics for processing said output signal from said at least one other sensing capacitor so that said output signal from said signal processing means is also substantially independent of the tilt angle of said container.

6. A fringing field capacitive sensor for measuring the level of a liquid having a dielectric constant inside a container, wherein said sensor is fixed to said container and comprises:

a non-conductive substrate with at least a first exposed surface;

at least three electrodes formed on said substrate and extending substantially from a lower level to a higher level, said lower level and said higher level bounding a desired measurement range, said at least three electrodes being configured to interact capacitively with said liquid constituting at least two sensing capacitors each with a capacitance which varies as a function of the liquid level within said desired measurement range, and wherein said functions that describe the dependence of said capacitances on said liquid level differ from each other; and signal processing means for converting said capacitances into electrical signals and processing said electrical signals to provide an output signal indicative of said liquid level relative to said sensor, wherein said output signal is substantially independent of the electrical properties of said liquid.

7. A sensor as recited in claim 6, wherein a ratio of said capacitances integrated from said lower level to said liquid level is proportional to said liquid level and substantially independent of the electrical properties of said liquid.

8. A sensor as recited in claim 6, wherein said ratio of said incremental capacitances integrated from said lower level to said liquid level is substantially linearly proportional to said liquid level and substantially independent of the electrical properties of said liquid.

9. A sensor as recited in claim 6, wherein said substrate comprises a flexible plastic sheet.

10. A sensor as recited in claim 6, wherein said electrodes are interdigitated and slanted.

11. A sensor as in claim 6, further including a shield electrode formed between electrodes of at least one of said at least two sensing capacitors for decreasing the sensitivity of said output signal to contamination and liquid splashes on said substrate.

12. A sensor as recited in claim 6, further including a sealed enclosure, wherein at least a portion of said signal processing means are contained within said enclosure.

13. A sensor as recited in claim 12, wherein said enclosure further encloses capacitor plates formed on said substrate and enabling compensation for temperature induced variation to said capacitances.

14. A sensor as recited in claim 6, wherein said at least two sensing capacitors are formed on said first exposed surface of said substrate.

15. A sensor as recited in claim 6, wherein said substrate has a second exposed surface, and a grounded layer is formed on said second exposed surface to protect against external electrical interference.

16. A sensor as recited in claim 6, wherein said container has a tilt angle relative to gravity in at least one axis, the sensor further comprising:

at least two additional electrodes formed on said substrate spaced apart from said at least three electrodes so as to form at least one other sensing capacitor with an output signal;

wherein said signal processing means is electrically associated with said at least one other sensing capacitor and further includes electronics for processing said output signal from said at least one other sensing capacitor so that said output signal from said signal processing means is also substantially independent of the tilt angle of said container.

17. A sensor as recited in claim 6, wherein said substrate is a Mylar sheet and said electrodes are printed with carbon ink.

* * * * *